United States Patent

Allen

[11] 4,227,557
[45] Oct. 14, 1980

[54] REPLICATION APPARATUS

[75] Inventor: Donald L. Allen, Northfield, Minn.

[73] Assignee: Don Allen, Inc., Northfield, Minn.

[21] Appl. No.: 966,093

[22] Filed: Dec. 4, 1978

[51] Int. Cl.³ ............................................. B27C 7/06
[52] U.S. Cl. .................................. 142/7; 144/144R; 144/154; 409/124
[58] Field of Search ........... 144/144 R, 144 B, 144 D, 144/144.5, 136 J, 154, 325; 142/7; 409/111, 112, 122, 123, 124

[56] References Cited

U.S. PATENT DOCUMENTS

| | | | |
|---|---|---|---|
| 1,363,238 | 12/1920 | Duchemin | 142/7 |
| 3,255,791 | 6/1966 | Garraffa | 142/7 |
| 3,468,353 | 9/1969 | Okey | 144/144 |
| 3,739,824 | 6/1973 | Hoenig | 144/144 R |
| 3,882,911 | 5/1975 | Pachmayr et al. | 144/136 J |
| 3,907,015 | 9/1975 | Pachmayr et al. | 144/136 J |
| 3,926,232 | 12/1975 | Pachmayr et al. | 144/136 J |
| 3,960,188 | 6/1976 | Schmidt | 144/144 A |
| 4,002,193 | 1/1977 | Schmidt | 142/7 |
| 4,084,483 | 4/1978 | Walker | 144/144 R |

Primary Examiner—W. Donald Bray

Attorney, Agent, or Firm—Orrin M. Haugen; Thomas J. Nikolai

[57] ABSTRACT

An apparatus for replicating three-dimensional articles which comprises a frame means for supporting, in parallelly disposed relationship, the article to be replicated and a blank workpiece. A parallelogram working frame is supported on the base frame means, with the parallelogram working frame being arranged for both longitudinal and transverse motion. The parallelogram working frame supports and carries a motor driven cutter assembly, and the cutter assembly includes a cutter head which is rotatably driven along a certain working axis. A laterally spaced stylus is provided for making contact with the surface of the article to be replicated. The parallelogram working frame carries a counterweight at the end opposed from the cutter assembly so as to accomplish ease of positioning, adjusting, and maintaining the cutter assembly in operative disposition. The apparatus further carries means for rotating the article to be replicated and the blank workpiece, with the arrangement being particularly adapted for replicating articles fabricated from wood, such as gun stocks and components of furniture.

4 Claims, 6 Drawing Figures

REPLICATION APPARATUS

BACKGROUND OF THE INVENTION

The present invention relates generally to an apparatus for replicating three-dimensional articles, and more particularly to an arrangement for precisely replicating such articles for end use as gun stocks or components of furniture. The apparatus includes a cutter head which is movable both laterally and transversely of the device, and further means are provided for adjustably tilting the cutter head and stylus so as to achieve a full degree of flexibility and freedom for working the cutter head.

It is frequently desirable to replicate articles of manufacture, such as, for example, gun stocks, components of furniture, and the like. These articles are, to a certain degree, perishable, and it is economically desirable to replace the perishable components so as to restore the article to a usable condition. Examples of such articles are, for example, guns such as sporting rifles which normally utilize a wooden stock, with the stock being subject to deterioration and damage at a rate significantly greater than the balance of the rifle. For various articles of furniture, for example, components such as arms, legs, or other members may be broken and the article of furniture may be salvaged if the broken member is replaced. The apparatus of the present invention is particularly adapted for replication of three-dimensional articles on a highly conforming and sound basis.

Apparatus for replicating three-dimensional articles have been known and utilized in the past. Frequently, however, these devices have been extremely cumbersome and the ordinary skilled artisan utilizing these devices has significant difficultiy in accurately replicating the article on a reliable and conforming basis. As such, articles prepared therefrom, such as gun stocks may not represent the predecessor article and as such, find limited application, particularly where accuracy is required. Furthermore, prior devices for replicating three-dimensional articles have frequently been cumbersome to utilize, and have lacked the required degree of flexibility and freedom so as to enable the artisan to recreate the article on an accurate basis. Furthermore, the apparatus of the present invention is provided with a counterweight system which permits the artisan to utilize the device for over extended periods of time without encountering fatigue which could otherwise impede the accuracy of the effort.

SUMMARY OF THE INVENTION

Therefore, it is a primary object of the present invention to provide an improved apparatus for replicating three-dimensional articles which employs a parallelogram working frame arrangement which supports a motor driven cutter head, and wherein the parallelogram working frame and cutter head are articulated within the basic frame means so as to permit a virtually unlimited degree of flexibility and freedom of motion of the cutter head within the structure.

It is a further object of the present invention to provide an improved apparatus for replicating three-dimensional articles which employs a parallelogram working frame supporting a cutter head assembly, and which is further provided with an adjustable counterweight for facilitating ease of operation of the apparatus.

It is yet a further object of the present invention to provide an improved apparatus for replicating three-dimensional articles which is capable of a high degree of fidelity in the replication, and wherein the apparatus is designed so as to provide a significant degree of flexibility for motion of the cutter head.

Other and further objects of the present invention will become apparent to those skilled in the art upon a study of the following specification, appended claims and accompanying drawings.

IN THE DRAWINGS

DESCRIPTION OF THE PREFERRED EMBODIMENT

Figure 1:
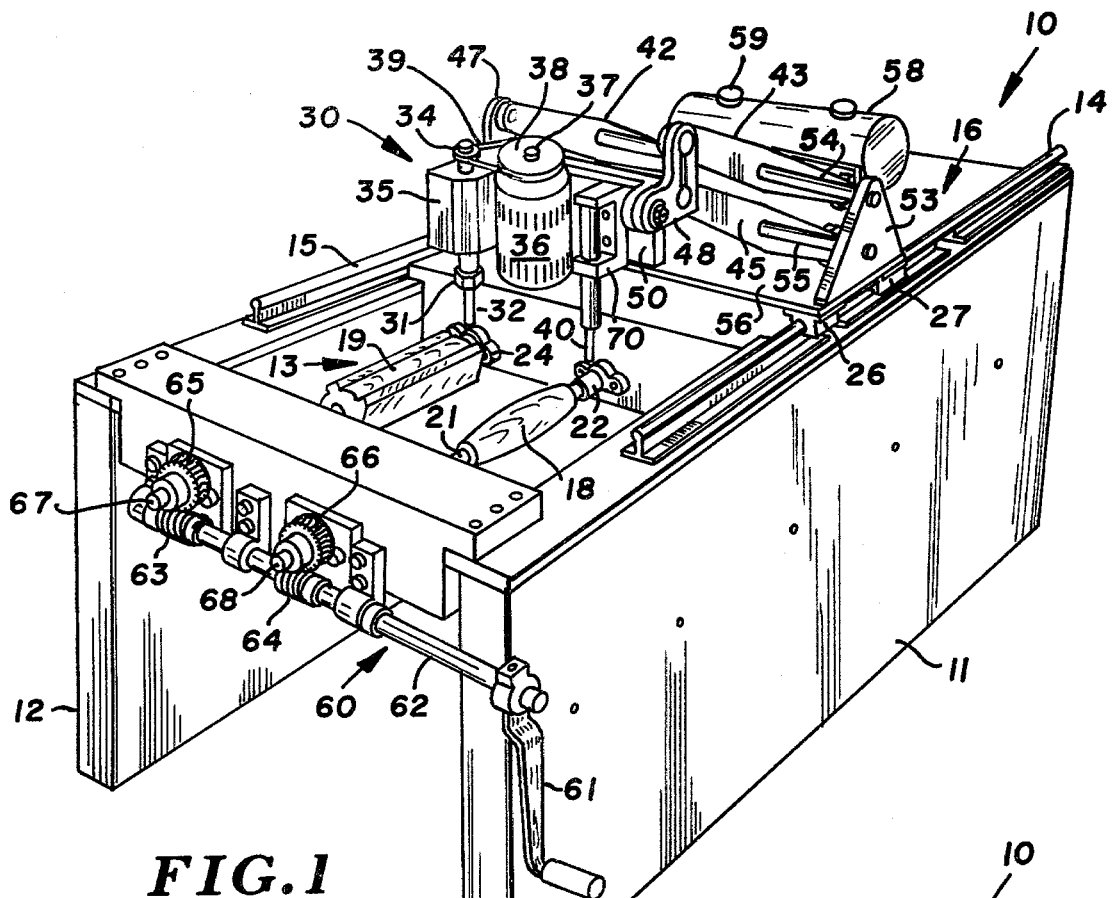
FIG. 1 is a perspective view of the replicating apparatus of the present invention, and illustrating the device with an article to be replicated and a blank workpiece mounted therein, and further illustrating the cutter head in retracted disposition relative to the work.

In accordance with the preferred embodiment of the present invention, and with particular attention being directed to FIG. 1 of the drawings, the replicating apparatus generally designated 10 includes a pair of laterally disposed side frames 11 and 12 which define a work-receiving zone 13, and which support a pair of spaced opposed rails 14 and 15. Rails 14 and 15 are utilized to support the cutter assembly carriage, with the cutter assembly carriage being shown generally at 16.

In the illustration of FIG. 1, an article to be replicated, such as a portion of a gun stock is illustrated at 18, and a blank workpiece is illustrated at 19. These articles are each maintained in holders, with a first holder means consisting of a pair of opposed gripping chucks 21 and 22 for retaining the article to be replicated, and with a corresponding pair of opposed gripping means being provided for the blank workpiece. The holder means for the blank workpiece includes, in general, a matching pair of axially aligned opposed gripping means, with one of the grippers being shown at 24. The opposed gripper is concealed in FIG. 1. The detail of the structure of the work holding means will be described more fully hereinafter.

Figure 2:
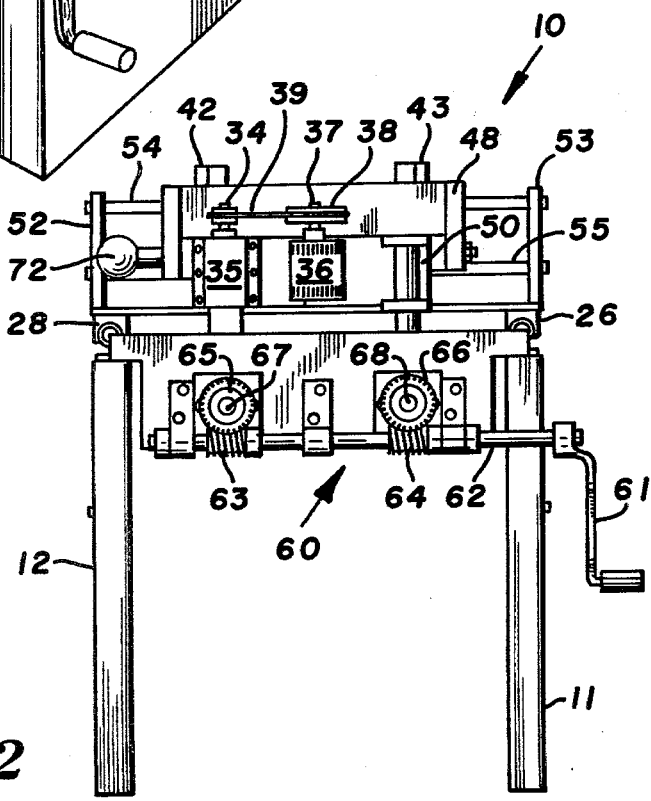
FIG. 2 is an end view of the apparatus, and showing that end adjacent the work holding structure.

As has been indicated, the cutter assembly carriage 16 is mounted upon rails 14 and 15, and is, of course, capable of axial longitudinal motion. A pair of bushings such as bushings 26 and 27 are supported on rail 14, and provide a base pad for the cutter assembly carriage. A similar and matching set of bushings is provided on the opposed end of the cutter assembly carriage for mounting on rail 15, with the opposed bushings being concealed in the view of FIG. 1, but shown in part in FIG. 2 at 28.

The cutter assembly carriage 16 comprises a parallelogram working frame which, in turn, supports cutter assembly generally designated 30. Cutter assembly 30 includes a rotary cutter chuck or the like as at 31, for releasably retaining a cutter tool 32 therewithin. Chuck 31 is disposed at the lower end of rotatable shaft 34, with shaft 34 being, of course, journaled for rotation within the confines of support member 35. Support members for such rotatable shafts are, of course, commercially available. An electrical motor is shown as at 36, with the motor 36 having an output shaft 37 carrying a pulley 38 fast thereon. Drive belt 39 is provided for delivering the rotary motion from output shaft 37 to shaft 34.

Laterally disposed from cutter tool 32 is stylus 40, with stylus 40 being mounted in parallel axial disposition with cutter tool 32, and arranged for motion consistent with and concurrent with cutter tool 32, as will be more fully explained hereinafter.

As has been indicated, the cutter assembly carriage 16 includes a parallelogram working frame. The parallelogram working frame consists of two pairs of rocker arms, with the first pair of rocker arms consisting of arms 42 and 43, and with the second pair of rocker arms consisting of arms 44 and 45. A pair of bell cranks such as laterally disposed bell cranks 47 and 48 are provided at the cutter assembly end of rocker arms 42-45, with the bell cranks 47 and 48 being provided with a pivotal cross-member or transverse member 50 forming a crank-cross member. Member 50 is mounted for adjustable rotational motion within bell cranks 47 and 48 in order to provide proper alignment and motion of cutter tool 32, as required by the efforts being undertaken. A pair of laterally disposed mounting brackets are provided for the cutter assembly carriage, such as mounting brackets 52 and 53, with the mounting brackets, in turn, supporting transverse shafts 54 and 55 which, in turn, are journably secured to and support the individual rocker arms 42-45. A base support plate may be utilized, if desired, as at 56 to provide suitable rigidity in the cutter assembly carriage, and thereby permit the cutter assembly carriage to be moved longitudinally while maintaining proper alignment at all times.

At the opposed end from the cutter assembly, there is positioned a counterweight such as counterweight 58. Counterweight 58 may, if desired, be provided with removable filler caps as at 59 to permit the weight of the counterweight to be adjusted to the extent desired.

Figure 3:
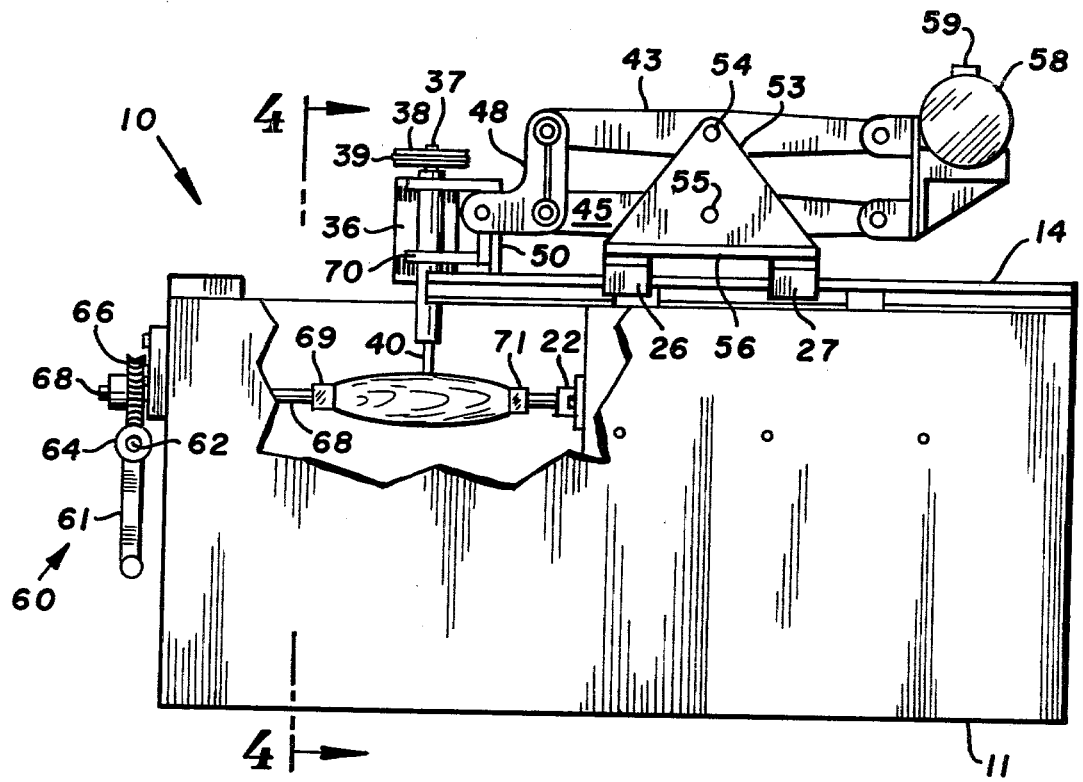
FIG. 3 is a side elevational view of the device illustrated in FIG. 1, with a portion of the side frame being broken away so as to more clearly illustrate the disposition of the article to be replicated disposed therewithin.
Figure 4:
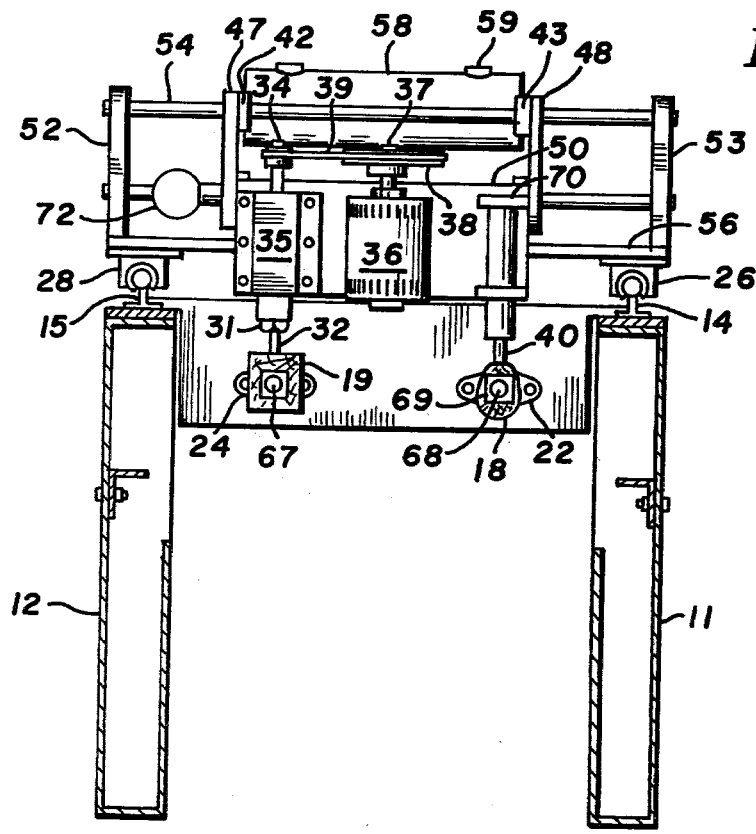
FIG. 4 is a vertical sectional view taken generally along the line and in the direction of the arrows 4—4 of FIG. 3.

As has been indicated earlier, a pair of axially aligned opposed gripping means are provided for the article to be replicated, and the workpiece respectively. Since it is frequently desirable to rotate the workpiece during the replication operation, a work rotating assembly is provided and is shown generaly at 60. The work rotating assembly 60 includes hand-operated crank 61 which is fast on shaft 62, with shaft 62 further carrying a pair of axially spaced worms 63 and 64. Worms 63 and 64 are in mesh with pinions 65 and 66 respectively, with pinions 65 and 66 being, in turn, fast upon shafts 67 and 68. Shafts 67 and 68 each carry a work gripping chuck, such as work gripping chuck 21 shown in FIG. 1. As has been previously indicated, a similar work gripping chuck is provided as at 22, with a gripping head being shown at 71. (See FIG. 3.) For most purposes, it will be appreciated that the design of the gripping heads as at 69 and 71 will be dictated by the configuration of the article to be retained.

In order to achieve accuracy of replication, each of the opposed gripping means is precisely axially aligned, and furthermore, the axial alignment between opposed gripping members is maintained in parallel disposition. In other words, the axis extending between gripping heads 69 and 71 is accurately parallelly disposed to the axis between those members carrying the blank workpiece. Inasmuch as a common shaft, such as shaft 62 carries worms 63 and 64 fast thereon, the rotation of the workpiece and the article to be replicated will be undertaken in unison.

GENERAL OPERATION

In order to undertake a replication operation, an article to be replicated as is reasonably accurately shown at 18, is mounted within the opposed gripping heads 69 and 71, and a blank workpiece, as at 19, is mounted within the corresponding opposed article gripping means including member 24. With the motor 36 energized, the operator moves the tip of stylus 40 into contact with the article to be replicated, whereupon cutter tool 32 acts to remove material from the workpiece 19 in conformity with the configuration of the article 18 to be replicated. As the operator moves the stylus so as to cover the entire exterior surface area of the article to be replicated, the cutter tool 32, is moved so as to cover the entire surface of the blank workpiece, removing material not in conformity with the article being replicated, thus providing a reproduced part of high fidelity quality. Vertical up-and-down motion is achieved with the combination of the rocker arms and bell cranks, particularly bell cranks 47 and 48. Cross-member 50, which carries support bracket 70 may be pivoted in order to provide proper alignment of stylus 40 and cutter tool 32, whenever desired. It will be appreciated that rails 14 and 15 permit longitudinal motion of the cutter assembly carriage, and furthermore, it will be appreciated that lateral motion may be achieved by the slidable coupling between shafts 54 and 55, and the individual rocker arms, 42-45, of the parallelogram working frame. Those longitudinal and lateral motions, together with the reciprocatory up and down motion possible with bell cranks at the working end, and taken further with the axial rotational motion of member 50 makes it possible for a substantially complete degree of freedom in the cutter head and cutter assembly.

Figure 5:
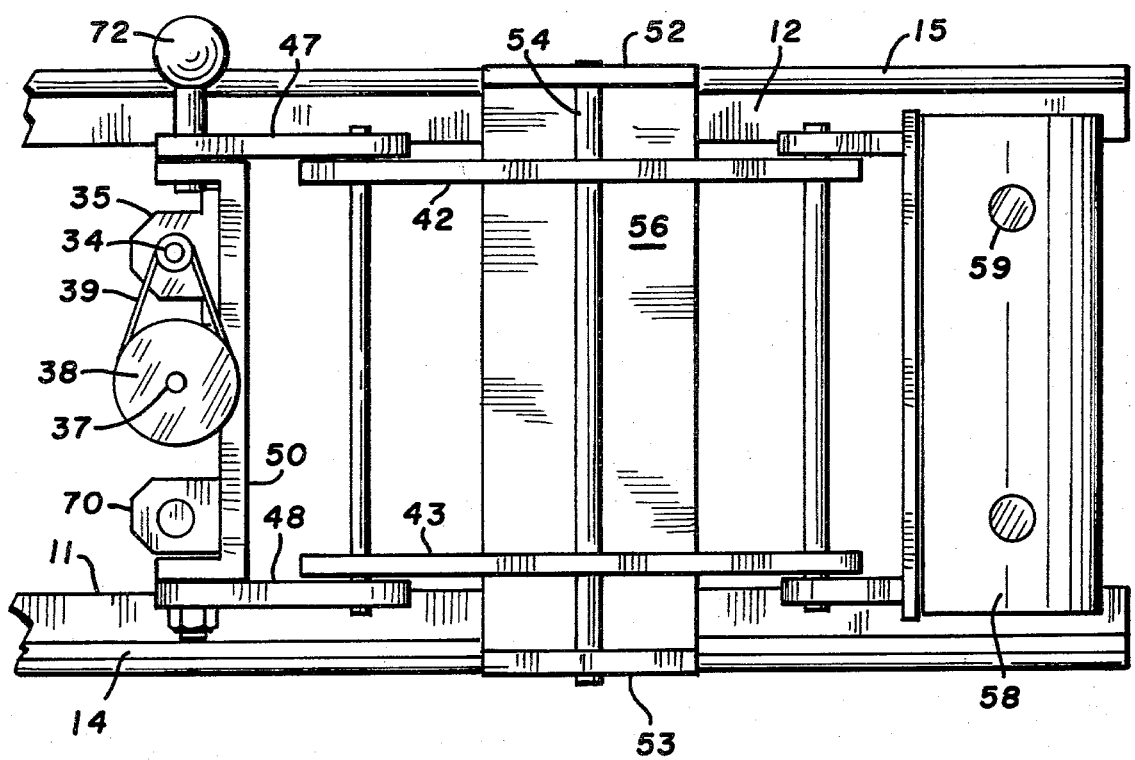
FIG. 5 is a top view of the device illustrated in FIG. 1, with FIG. 5 being illustrated on a slightly enlarged scale and showing the primary features of the parallelogram working frame and cutter assembly.
Figure 6:
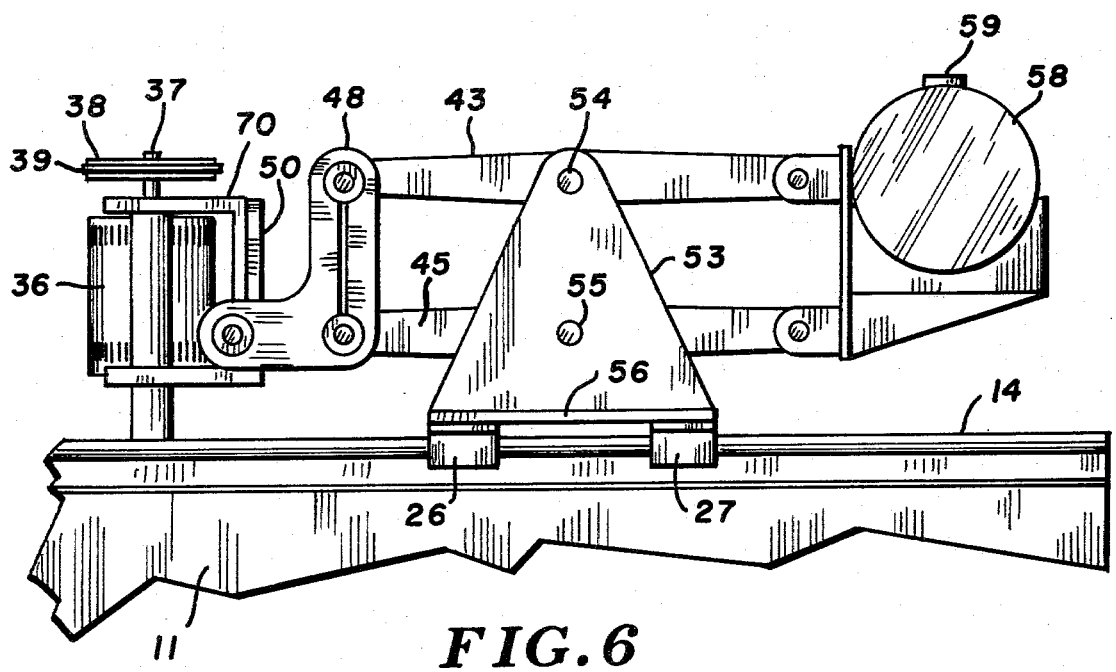
FIG. 6 is a side elevational view of the parallelogram working frame, the cutter assembly, and the counterweight assembly, with FIG. 6 being shown on the same enlarged scale as FIG. 5.

In the event the operator wishes to modify the counterweight, a full degree of equillibrium control may be achieved by adding to or taking from the quantity of counterweight material maintained within the enclosure 58. The type of material selected, and its density may be determined by the extent of weight of the cutter assembly. It will be appreciated that the operator may work from either side of the apparatus, however for most purposes, a gripping handle is most conveniently located on the side adjacent the blank workpiece, and a gripping handle is illustrated in FIG. 5 as at 72.

I claim:

1. Apparatus for replicating three-dimensional articles comprising:
    (a) base frame means, first and second holder means secured to said base frame means for retaining the article to be replicated and a blank workpiece respectively, and laterally spaced opposed rail means secured to said base frame means for supporting a cutter assembly carriage thereon;
    (b) said first and second holder means each including axially aligned opposed gripping means with said first and second holder means being spaced apart a predetermined distance along parallelly disposed axes, said gripping means being journaled within said base frame means for axial rotation about said parallel axes, and means for rotating said opposed gripping means in unison, one with the other;

(c) a longitudinally movable cutter assembly comprising a cutter head, motor means for driving said cutter head about a certain cutting axis, stylus means spaced from said cutter head and having a contact tip for making contact with the surface of said article to be replicated, said contact tip being spaced from the axis of said cutter head by a distance equal to said predetermined distance, and a parallelogram working frame supporting said cutter assembly and including a pair of opposed mounting brackets slidably disposed on said opposed rail means;

(d) first and second parallelly disposed transverse shafts secured to said mounting brackets, each said transverse shaft having a pair of rocker arms journably mounted thereon, each said pair of rocker arms forming upper and lower members of said parallelogram working frame, said rocker arms being journaled for both pivotal and slidable motion upon said transverse shafts;

(e) a pair of laterally disposed bell cranks journably coupled to laterally opposed ends of said pairs of rocker arms to form one generally vertical end of said parallelogram working frame and with said laterally disposed bell cranks supporting a cross-member having a surface upon which said cutter assembly is supported, said cutter assembly being arranged for generally vertical up-and-down reciprocal motion with said rocker arms; and (f) a pair of laterally opposed counterweight supporting brackets secured to said pairs of rocker arms in opposed relationship to said bell cranks and supporting a counterweight substantially balancing the weight of said cutter assembly.

2. The apparatus as defined in claim 1 being particularly characterized in that said cross-member is journaled for pivotal rotation within said opposed bell cranks.

3. The apparatus as defined in claim 1 being particularly characterized in that means are provided to permit adjustment of the weight of said counterweight.

4. The apparatus as defined in claim 1 being particularly characterized in that matching worm and pinion gears are provided on said base frame means for rotation of each of said gripping means.

* * * * *